US012612873B2

(12) United States Patent
Fransson et al.

(10) Patent No.: US 12,612,873 B2
(45) Date of Patent: Apr. 28, 2026

(54) AEROSPACE THERMAL MANAGEMENT SYSTEM

(71) Applicant: Heart Aerospace AB, Gothenburg (SE)

(72) Inventors: Joel Fransson, Gothenburg (SE); Francisco Martins, Gothenburg (SE); Nils Carlson, Kållered (SE); Enis Dönmez, Gothenburg (SE)

(73) Assignee: Heart Aerospace AB, Gothenburg (SE)

( * ) Notice: Subject to any disclaimer, the term of this patent is extended or adjusted under 35 U.S.C. 154(b) by 0 days.

(21) Appl. No.: 19/041,081

(22) Filed: Jan. 30, 2025

(65) Prior Publication Data

US 2025/0243804 A1    Jul. 31, 2025

(30) Foreign Application Priority Data

Jan. 31, 2024    (SE) ................................... 2450100-9

(51) Int. Cl.
  F02C 6/00      (2006.01)
  B64D 27/33     (2024.01)
  B64D 31/18     (2024.01)
  F01D 15/10     (2006.01)
  F02C 7/16      (2006.01)

(52) U.S. Cl.
  CPC ............... F02C 6/00 (2013.01); B64D 27/33 (2024.01); B64D 31/18 (2024.01); F02C 7/16 (2013.01); F01D 15/10 (2013.01)

(58) Field of Classification Search
  CPC ... F02C 6/00; F02C 7/16; B64D 27/33; B64D 31/18; F01D 15/10
  See application file for complete search history.

(56) References Cited

U.S. PATENT DOCUMENTS

| | | | | |
|---|---|---|---|---|
| 10,676,205 B2 * | 6/2020 | Niergarth | ................ | F01D 15/10 |
| 10,752,129 B2 * | 8/2020 | Julien | .................... | B60L 58/27 |
| 10,800,539 B2 * | 10/2020 | Niergarth | ............... | B64D 27/35 |
| 12,172,762 B2 * | 12/2024 | Spitzer | ................... | B64D 27/08 |
| 2020/0130534 A1 | 4/2020 | Julien et al. | | |
| 2020/0331622 A1 | 10/2020 | Niergarth et al. | | |
| 2022/0097862 A1 * | 3/2022 | Sugitani | ............... | B64D 27/357 |

(Continued)

FOREIGN PATENT DOCUMENTS

| | | | | |
|---|---|---|---|---|
| EP | 3473547 A1 * | 4/2019 | ............. | F02B 63/04 |
| EP | 3480114 | 3/2020 | | |

(Continued)

OTHER PUBLICATIONS

International Search Report and Written Opinion regarding PCT/EP2025/052327, mailed Mar. 21, 2025 (16 pgs.).

(Continued)

*Primary Examiner* — William H Rodriguez
(74) *Attorney, Agent, or Firm* — Jeffrey Schox

(57)    ABSTRACT

The present invention relates to a thermal management system (10) for a hybrid electric aircraft (100), wherein the system comprises: at least one aircraft unit (12) configured to be used in electric propulsion of the aircraft; a first fluid circuit (18) arranged to cool the at least one aircraft unit; an internal combustion engine (28); a second fluid circuit (30) for the internal combustion engine; and a heat exchanger (20), wherein the first fluid circuit is arranged to provide heating to the second fluid circuit via said heat exchanger.

15 Claims, 5 Drawing Sheets

(56)                References Cited

U.S. PATENT DOCUMENTS

| | | |
|---|---|---|
| 2022/0281351 A1 | 9/2022 | Bartsch et al. |
| 2024/0133335 A1* | 4/2024 | Freer .......................... F01P 7/16 |
| 2025/0242937 A1* | 7/2025 | Carlson ................. B64D 27/33 |
| 2025/0289581 A1* | 9/2025 | Pazinski ................ B64D 27/33 |

FOREIGN PATENT DOCUMENTS

| | | |
|---|---|---|
| EP | 3480114 B1 | 4/2020 |
| GB | 2504072 A | 1/2014 |
| GB | 2594072 A | 10/2021 |

OTHER PUBLICATIONS

Swedish Office Action regarding related application 2450100-9, dated Sep. 11, 2024 (7 pages).

* cited by examiner

AEROSPACE THERMAL MANAGEMENT SYSTEM

TECHNICAL FIELD

The present disclosure relates to a thermal management system for a hybrid electric aircraft. The present disclosure also relates to hybrid electric aircraft comprising at least one such thermal management system, to a thermal management method, and to a computer program product.

BACKGROUND

Different configurations are envisaged for hybrid electric aircrafts, such as parallel hybrid propulsion and serial hybrid propulsion.

SUMMARY

In one or more configurations of a hybrid electric aircraft, it may be desired to start—while the aircraft is flying—an internal combustion engine for propulsion of the aircraft. However, when starting, the internal combustion engine will be cold as the ambient air is very cold at higher altitudes, leading to stresses on bearings etc., which might decrease the life of the turbine engine.

Although engine OEMs are testing their engines for cold soak (engine remaining off in a low temperature ambient for long time and tested to be re-started), these tests do not necessarily cover low temperature in flight conditions (more demanding than ground low temperature). Also, cold soak is usually considered an unusual condition (which involves maintainability checks afterwards) and not a condition to which the engine is subjected at all times as the case may be in a hybrid electric aircraft, which is why new precautions are necessary.

Moreover, even though the engine indeed could start in the temperature envelope that the hybrid electric aircraft is encountering, it may not start fast enough because of the warm-up time required before power extraction. "Successful warm-up" is conventionally characterized with the engine's oil temperature reaching to a certain level. There might also be other aspects of warm-up apart from oil temperature, such as where engine secondary air systems reach to a steady-state operating pressures and where engine hot parts reach their "hot dimensions" during warm-up which ensures safe and high performance operation.

An object of the present disclosure is to provide an improved thermal management system which seeks to mitigate, alleviate, or eliminate one or more of the above-identified deficiencies.

According to a first aspect of the present invention, this object is obtained by a thermal management system for a hybrid electric aircraft, wherein the system comprises: at least one aircraft unit configured to be used in electric propulsion of the aircraft; a first fluid circuit arranged to cool the at least one aircraft unit; an internal combustion engine; a second fluid circuit for the internal combustion engine; and a heat exchanger, wherein the first fluid circuit is arranged to provide heating to the second fluid circuit via said heat exchanger.

The present invention is at least partly based on the understanding that waste heat from an aircraft unit used in electric propulsion of the aircraft, which aircraft unit may be on and generate heat while the internal combustion engine is off in one or more operational modes of the hybrid electric aircraft, beneficially can be used to heat the internal combustion engine before the internal combustion engine is started while flying, instead of just being wasted. This may result in less stress on the internal combustion engine and/or prolonged life of the internal combustion engine. Another benefit is increased starting reliability of the internal combustion engine when flying. That is, the invention may improve the starting process by introducing more favourable conditions for reliable starting and faster warm-up of the internal combustion engine.

The at least one aircraft unit may be an electric propulsion unit comprising an electric motor and/or at least one motor control unit.

Moreover, the internal combustion engine may be a turboprop engine configured for propulsion of the aircraft.

Moreover, the first fluid circuit may be arranged to provide heating to the second fluid circuit via said heat exchanger when the at least one aircraft unit is on, the internal combustion engine is off, and the aircraft is flying.

Moreover, the second fluid circuit may further be arranged to provide heating to the first fluid circuit via said heat exchanger when the at least one aircraft unit is off, the internal combustion engine is on, and the aircraft is flying. This may beneficially prevent or handle a cold soak condition of the at least one aircraft unit (in particular an electric motor and/or at least one motor control unit) using waste heat from the internal combustion engine.

The second fluid circuit may comprise at least one channel provided in the internal combustion engine/turboprop engine.

The second fluid circuit may be an oil circuit.

The first fluid circuit may be arranged to provide heating to a reservoir of the second fluid circuit via said heat exchanger.

The first fluid circuit or the second fluid circuit may be arranged to provide heating to an engine starter battery associated with the internal combustion engine/turboprop engine.

The heat exchanger may be connected to the first fluid circuit downstream of the at least one aircraft unit/electric propulsion unit.

The heat exchanger may be a liquid-to-liquid heat exchanger.

The first fluid circuit may be arranged to provide heating to the second fluid circuit via said heat exchanger a predetermined time before the internal combustion engine/turboprop engine is started.

The first fluid circuit may comprise a bypass or flow selector valve configured to divert first fluid in the first fluid circuit past the heat exchanger when the at least one aircraft unit/electric propulsion unit is on, the internal combustion engine/turboprop engine is on, and the aircraft is flying.

According to second aspect of the of the present invention, there is provided a hybrid electric aircraft comprising at least one thermal management system according to the first aspect. The aircraft may for example be one or more of: an airplane, a fixed-wing aircraft, a conventional take-off and landing (CTOL) aircraft, a monoplane, and adapted to be flown by a pilot on board the aircraft. The aircraft may for example comprise one or more of: wings, braced wings, a fuselage, an empennage, a cockpit, a passenger cabin, flight control surfaces (such as ailerons, elevators, a rudder, flaps, air brakes, etc.), and a (wheeled and/or retractable) landing gear.

According to third aspect of the of the present invention, there is provided a thermal management method, comprising: cooling, by a first fluid in a first fluid circuit, an electric propulsion unit comprising an electric motor and/or at least one motor control unit used in electric propulsion of a hybrid electric aircraft; providing heating from the first fluid in the first fluid circuit to a second fluid in a second fluid circuit for a turboprop engine via a heat exchanger connected to the first fluid circuit downstream of the electric propulsion unit when the electric propulsion unit is on, the turboprop engine is off, and the aircraft is flying; and providing heating from the second fluid circuit to the first fluid circuit via said heat exchanger when the electric propulsion unit is off, the turboprop engine is on, and the aircraft is flying. This aspect may have the same or similar features and/or technical effects as the first and/or second aspect, and vice versa.

The method may further comprise circulating the second fluid in the second fluid circuit.

According to a fourth aspect of the present invention, there is provided a computer program product comprising computer program code to perform, when executed on a computer of a thermal management system according to the first aspect, the steps of: controlling at least one first pump to circulate a first fluid in the first fluid circuit for cooling the electric propulsion unit, and controlling a bypass or flow selector valve of the first fluid circuit to provide heating from the first fluid to a second fluid in the second fluid circuit via the heat exchanger when the electric propulsion unit is on, the turboprop engine is off, and the aircraft is flying; and controlling at least one other pump to circulate the second fluid in the second fluid circuit, and controlling a bypass of the first fluid circuit, or flow selector valves of the first and second fluid circuits, to provide heating from the second fluid to the first fluid in the first fluid circuit via the heat exchanger when the electric propulsion unit is off, the turboprop engine is on, and the aircraft is flying. The computer may be (included in) at least one control unit of the thermal management system. This aspect may have the same or similar features and/or technical effects as any one of the previous aspects, and vice versa.

According to a fifth aspect of the present invention, there is provided a computer-readable storage medium comprising the computer program product according to the fourth aspect. The computer-readable storage medium may be a non-transitory computer-readable storage medium.

According to a sixth aspect of the present invention, there is provided an electrical signal embodied on a carrier wave and propagated on an electrical medium, the electrical signal comprising the computer program product according to the fourth aspect.

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

DETAILED DESCRIPTION

Figure 1:
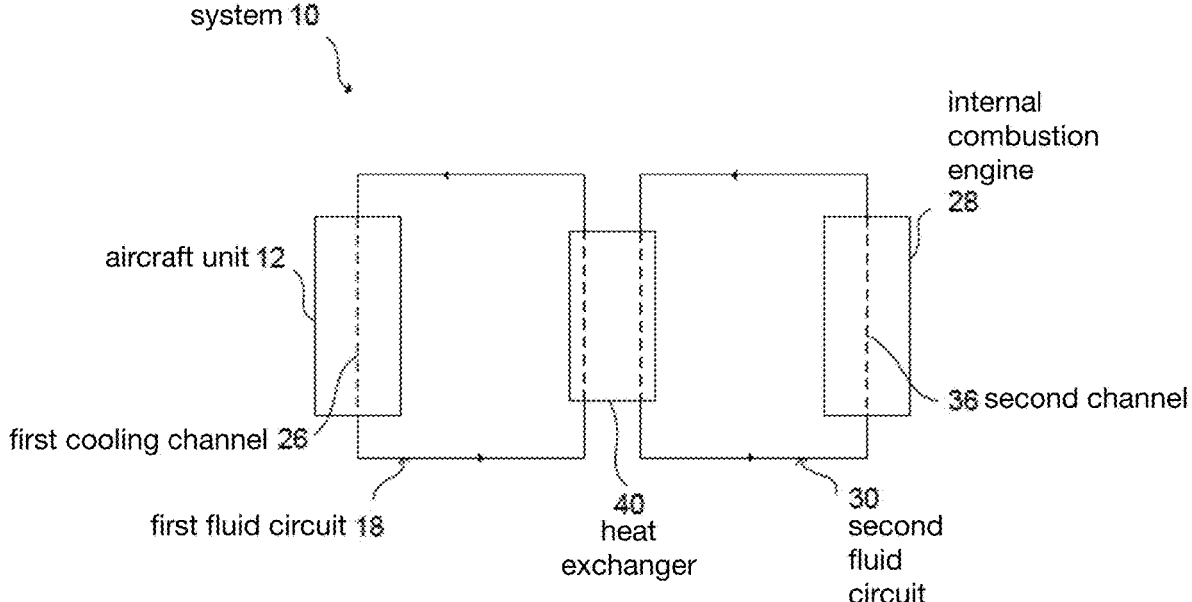
FIG. 1 schematically illustrates a first embodiment of a thermal management system.

Aspects of the present disclosure will be described more fully hereinafter with reference to the accompanying drawings. The system and/or method disclosed herein can, however, be realized in many different forms and should not be construed as being limited to the aspects set forth herein. Like numbers in the drawings refer to like elements throughout.

The terminology used herein is for the purpose of describing particular aspects of the disclosure only, and is not intended to limit the invention. As used herein, the singular forms "a", "an" and "the" are intended to include the plural forms as well, unless the context clearly indicates otherwise.

Figure 2:
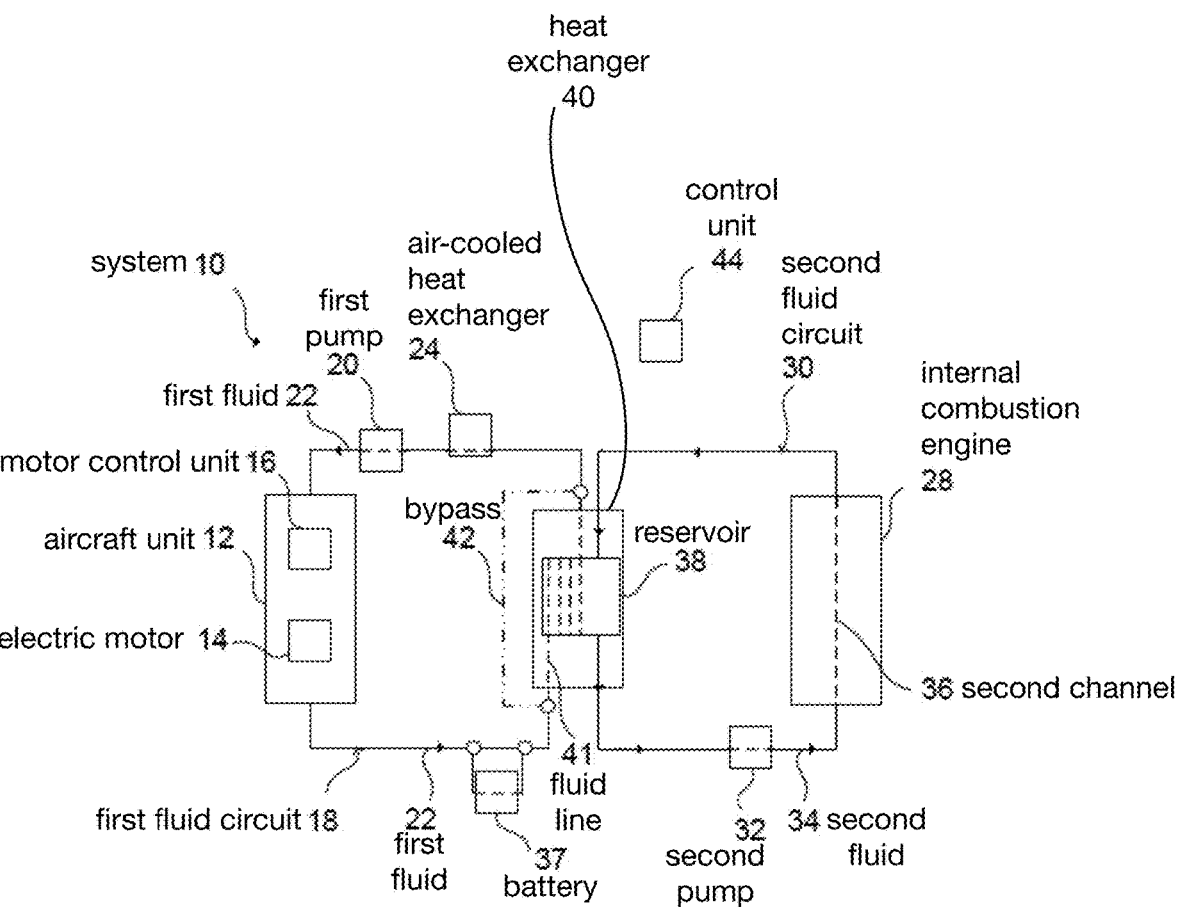
FIGS. 2-3 schematically illustrate further embodiments of a thermal management system. It should be noted that the present system may feature only one of these embodiments, all of the embodiments, or any combination of the embodiments.
Figure 3:
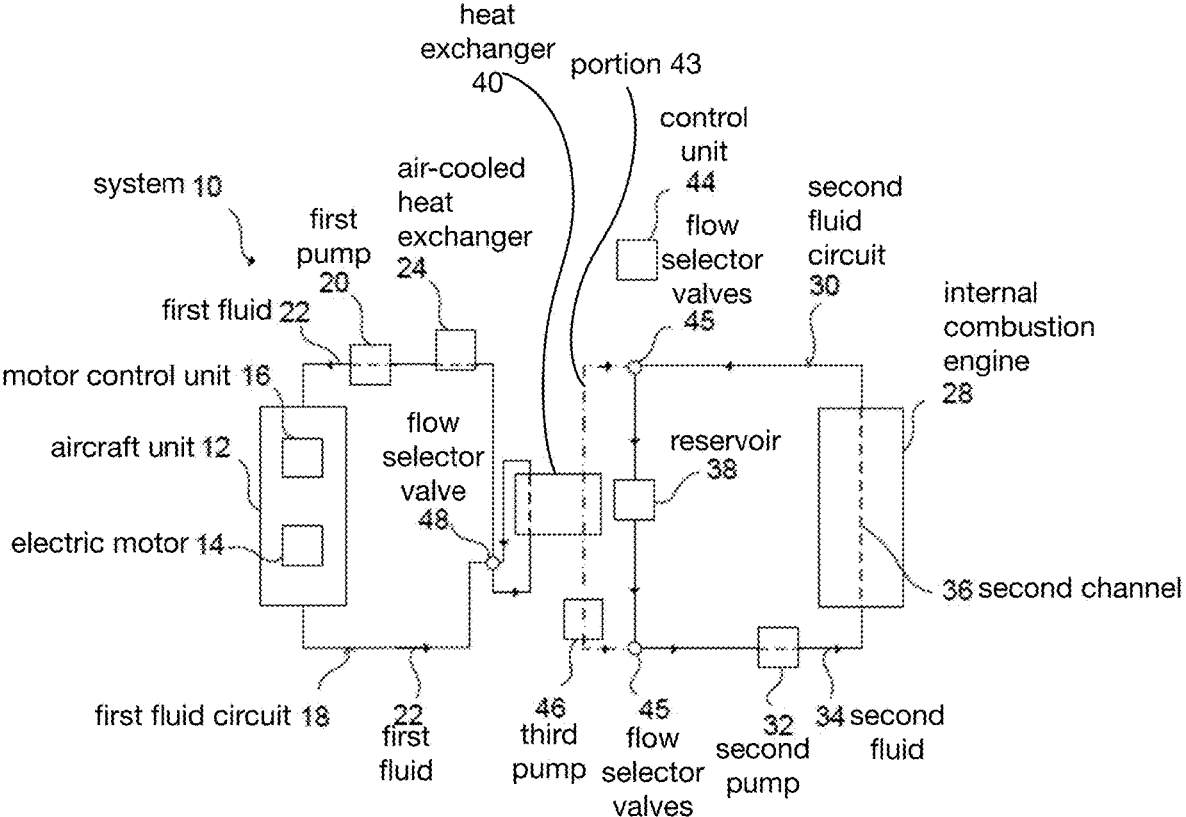
Figure 5:
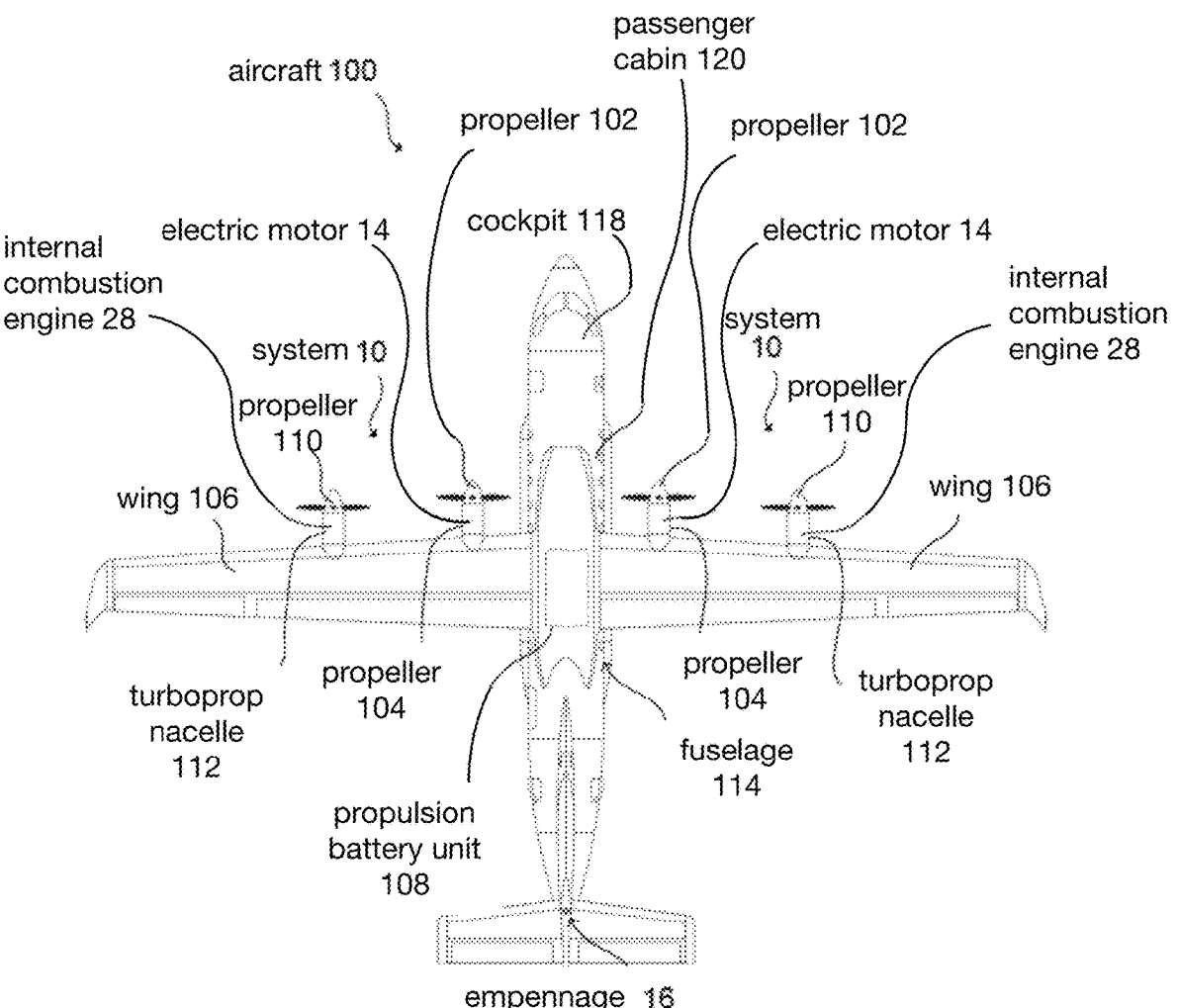
FIG. 5 is a top view of an aircraft comprising at least one thermal management system.

FIGS. 1 to 3 show embodiments of a thermal management system 10 for a hybrid electric aircraft 100 (see FIG. 5).

The thermal management system 10 comprises at least one aircraft unit 12 configured to be used in electric propulsion of the aircraft 100.

The at least one aircraft unit 12 may for example be an electric propulsion unit (EPU) comprising an electric motor 14 and at least one motor control unit (MCU) 16. The electric motor 12 may be coupled to a propeller 102 (see FIG. 5). The at least one motor control unit 16 may be adapted to control the electric motor 14. Each motor control unit 16 may for example include power semiconductor switching devices, current and voltage measurement devices, control boards and related software as well as filter capacitors. Each motor control unit 16 may comprise an inverter. The at least one motor control unit 16 may be electrically connected to the electric motor 14.

Alternatively the at least one aircraft unit 12 could be at least one propulsion battery unit 108 (see FIG. 5). The at least one propulsion battery unit may be configured to power an electric propulsion unit of the type described in the preceding paragraph.

The thermal management system 10 further comprises a first fluid circuit 18 arranged to cool the at least one aircraft unit 12. The first fluid circuit 18 may for example comprise at least one first pump 20 arranged to circulate a first fluid 22 inside the first fluid circuit 18. Moreover, the first fluid circuit 18 may comprise a (ram) air-cooled heat exchanger 24, for cooling the first fluid 22. Moreover, the first fluid circuit 18 may comprise at least one first cooling channel 26. The at least one first cooling channel 26 may be provided in the at least one aircraft unit 12. Accordingly, the first fluid 22 may circulate through the at least one aircraft unit 12 inside the at least one first cooling channel 26 to cool the at least one aircraft unit 12. The first fluid 22 may be a coolant. The first fluid 22 may be a liquid.

In case the at least one aircraft unit 12 is an electric propulsion unit, the electric motor 14 and the at least one motor control unit 16 may be fluidly connected in series or in parallel or any combination thereof in the first fluid circuit 18. Moreover, the at least one motor control unit 16 could be directly cooled by first fluid circuit 18, whereas the electric motor 14 is cooled by another circuit which in turn is cooled by the first fluid circuit 18 via a heat exchanger (whereby the electric motor 14 is indirectly cooled by the first fluid circuit 18), as in applicant's co-pending US patent application entitled AEROSPACE ELECTRIC PROPULSION THERMAL MANAGEMENT SYSTEM filed on the same day as the present application, the content of which herein is incorporated by reference.

In case the at least one aircraft unit 12 is a plurality of propulsion battery units, the propulsion battery units may for example be fluidly connected in parallel in the first fluid circuit 18.

The thermal management system 10 further comprises an internal combustion engine (ICE) 28, in particular an ICE 28 configured to be used in propulsion of the aircraft 100. The internal combustion engine 28 may be a turbine engine. In a preferred embodiment, the internal combustion engine 28 is, or at least forms part of, a turboprop engine configured for propulsion of the hybrid electric aircraft 100. The turboprop engine may be coupled to a propeller 104 (see FIG. 5). Alternatively, the turbine engine may be part of an auxiliary power unit, i.e. an auxiliary power unit turbine engine, which auxiliary power unit may be used for serial hybrid propulsion. Specifically, the auxiliary power unit may be configured to power the electric motor and/or to charge at least one propulsion battery unit powering the electric motor e.g. for range extension.

The thermal management system 10 further comprises a second fluid circuit 30 for the internal combustion engine 28. The second fluid circuit 30 may for example comprise at least one second pump 32 arranged to circulate a second fluid 34 inside the second fluid circuit 30. The at least one second pump 32 may be shaft driven. Moreover, the second fluid circuit 30 may comprise at least one second channel 36. The at least one second channel 36 may be provided in the internal combustion engine 28. Accordingly, the second fluid 34 may circulate through the internal combustion engine 28 inside the at least one second channel 36. The second fluid circuit 30 may form part of a ("standard") cooling and/or lubrication system of the internal combustion engine 28. The second fluid 34 may be a liquid. The second fluid 34 may be an oil, such an engine oil. The second fluid circuit 30 could also comprise a reservoir 38, such as an oil tank.

The thermal management system 10 further comprises heat exchanger 40. This heat exchanger 40 may be connected to the first fluid circuit 18. Specifically, the heat exchanger 40 may be connected to the first fluid circuit 18 downstream of the at least one aircraft unit 12 (and upstream of any air-cooled heat exchanger 24). Heat exchanger 40 may (also) be connected to the second fluid circuit 30. Specifically, the heat exchanger 40 may be connected to the second fluid circuit 30 upstream of the internal combustion engine 28. The heat exchanger 40 may be a liquid-to-liquid heat exchanger, for example a water/oil heat exchanger 40.

In one or more first operational modes of the hybrid electric aircraft 100, (the first fluid 22 in) the first fluid circuit 18 is arranged to provide heating to (the second fluid 34 in) the second fluid circuit 30 via the heat exchanger 40. The first operational mode may for example be fully electric flight, wherein the at least one aircraft unit 12 is on (and thus generates heat) and the internal combustion engine 28 is off (and the aircraft 100 is flying). Specifically, the first fluid circuit 18 may be arranged to provide heating to the second fluid circuit 30 via heat exchanger 40 a predetermined time before the internal combustion engine 28 is started while flying, e.g. before switching to a hybrid operational mode of the aircraft 100. In a hybrid operational mode, both the at least one aircraft unit 12 and the internal combustion engine 28 (for example both the electric motor and the turboprop engine) may be on and provide propulsion of the aircraft 100.

Moreover, the first fluid circuit 18 may be arranged to provide heating to (the second fluid 34 in) the reservoir 38 of the second fluid circuit via heat exchanger 40. Here, a fluid line 41 fluidly connected to the first fluid circuit 18 may be at least partly wrapped around the reservoir 38 in the heat exchanger 40 (heating jacket type configuration), as schematically illustrated in FIG. 2. In an alternative embodiment, the second fluid circuit 30 may comprise a portion 43 (indicated by dash dot line) fluidly connected in parallel to the reservoir 38, preferably via flow selector valves 45, which portion 43 is connected to the heat exchanger 40, as illustrated in FIG. 3. A third pump 46 may be arranged to circulate second fluid 34 inside the portion 43 and through the reservoir 38 and the heat exchanger 40. In this way, the second fluid 34 may be heated even if the at least one second pump 32 is not operating. The third pump 46 may be an electric pump.

In the hybrid operational mode, or whenever else desired, the heat exchanger 40 could be "disabled" or "disconnected" from the rest of the thermal management system 10, for example by diverting the first fluid 22 through a bypass 42, as illustrated by the dash dot dot line in FIG. 2. Alternatively, the heat exchanger 40 could be "disabled" or "disconnected" from the rest of the thermal management system 10 by a flow selector valve 48, as illustrated in in FIG. 3. It should be noted that the bypass 42 in FIG. 2 could be replaced by the flow selector valve 48 in in FIG. 3, and vice versa.

Exemplary operation of the thermal management system 10 will now be described with further reference to FIG. 4. Operation of the thermal management system 10 may correspond to a thermal management method according to the second aspect of the present invention. The method may at least partly be performed when the at least one aircraft unit 12 is on/operational (and thus generates heat), the internal combustion engine 28 is off, and the aircraft 100 is flying (i.e. first operational mode).

At S1, the method may comprise cooling, by the first fluid 22 in the first fluid circuit 18, the at least one aircraft unit 12 used in electric propulsion of the hybrid electric aircraft 100. Specifically, the first fluid 22 in the first fluid circuit 18 may be cooled by the air-cooled heat exchanger 24 (if needed), and circulated by the at least one first pump 20 through the at least one aircraft unit 12 inside the at least one first cooling channel 26 to cool the at least one aircraft unit 12, whereby the first fluid 22 gets heated.

The method may further comprise providing (at S2) heating from the first fluid 22 in the first fluid circuit 18 to the second fluid 34 in the second fluid circuit 30 via the heat exchanger 40. Specifically, the heated first fluid 22 may be further circulated by the at least one first pump 20 through the heat exchanger 40 to heat the second fluid 34 in the second fluid circuit 30.

That is, waste heat from the at least one aircraft unit 12 may beneficially be used to heat the internal combustion engine 28, or at least its engine oil 34, before the internal combustion engine 28 is started while flying, instead of just being wasted. This may result in less stress on the internal combustion engine 28 and/or prolonged life of the internal combustion engine 28. Another important safety-related benefit is increased starting reliability of the internal combustion engine 28 when flying.

The heated second fluid 34 may optionally be circulated (step S3), by the at least one second pump 32, in the second fluid circuit 30 through the internal combustion engine 28, for lubrication and/or heating of the internal combustion engine 28.

The method could optionally also include diverting (step S4) at least some or all of the first fluid 22 past the heat exchanger 40, through the bypass 42 or by using the flow selector valve 48, for example in a hybrid operational mode.

Moving on, in one or more second operational modes of the hybrid electric aircraft 100, (the second fluid 34 in) the second fluid circuit 30 may be arranged to provide heating to (the first fluid 22 in) the first fluid circuit 18 via the heat exchanger 40, for heating the at least one aircraft unit 12. The second operational mode may for example be turboprop only flight, wherein the internal combustion engine 28 is on/running (and thus the second fluid 34 is heated) and the at least one aircraft unit 12 is off (and the aircraft 100 is flying). Specifically, the second fluid circuit 30 may be arranged to provide heating to the first fluid circuit 18 via heat exchanger 40 a predetermined time before the at least one aircraft unit 12 is started while flying, e.g. before switching to a hybrid operational mode of the aircraft 100.

Figure 4:
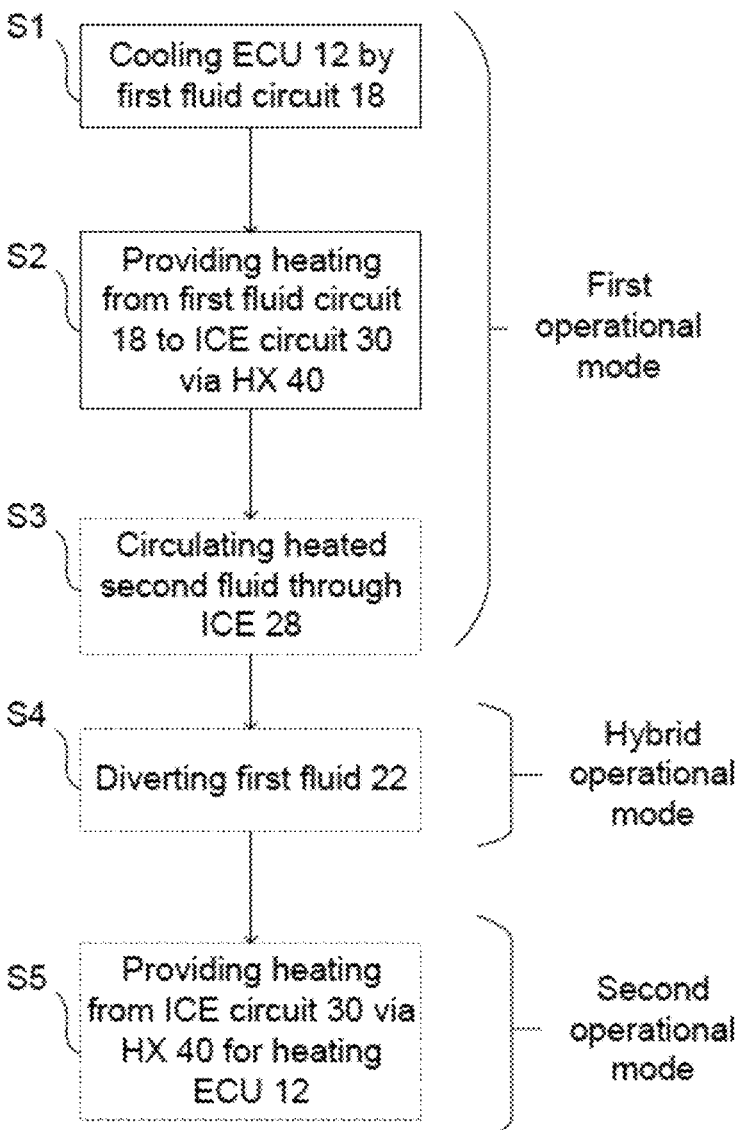
FIG. 4 is a flowchart of a thermal management method.

Accordingly, the method in FIG. 4 may additionally (or alternatively) comprise providing (step S5) heating from the second fluid circuit 30 to the first fluid circuit 18 via the heat exchanger 40 for heating the at least one aircraft unit 12.

In FIG. 2, step S5 may be realized by circulating the second fluid 34 in the second fluid circuit 30 by the at least one second pump 32, and disabling the bypass 42 of the first fluid circuit 18, to provide heating from the second fluid 34 to the first fluid 22 in the first fluid circuit 18 via the heat exchanger 40 when the at least one aircraft unit (e.g. electric propulsion unit) 12 is off, the internal combustion engine (e.g. turboprop engine) 28 is on, and the aircraft 100 is flying.

In FIG. 3, step S5 may be realized by circulating the second fluid 34 in the second fluid circuit 30 by the at least one second pump 32, allowing some of the second fluid 34 into portion 43 by means of the (variable) flow selector valves 45, and enabling or connecting the heat exchanger 40 by the flow selector valve 48, to provide heating from the second fluid 34 to the first fluid 22 in the first fluid circuit 18 via the heat exchanger 40 when the at least one aircraft unit (e.g. electric propulsion unit) 12 is off, the internal combustion engine (e.g. turboprop engine) 28 is on, and the aircraft 100 is flying.

Returning briefly to FIGS. 2 and 3, the system 10 may further comprise at least one (system) control unit 44. The at least one control unit 44 may comprise hardware (such as at least one processor) and software. The at least one control unit 44 may be configured to control one or more components of the thermal management system 10, such as the at least one first pump 20, the at least one second pump 32, the third pump 46, flow selector valves 45, an air inlet door for the air-cooled heat exchanger 24, the bypass 42, and/or the flow selector valve 48. The control by the at least one control unit 44 may be based on various inputs related to the thermal management system 10 and/or the aircraft 100, such as temperatures, operational states of components, operational modes of the aircraft, etc.

Moreover, one of the first fluid circuit 18 and the second fluid circuit 30 could optionally be arranged to provide heating to a battery 37 of a starter of the internal combustion engine 28, as exemplarily illustrated in FIG. 2, in particular when least one aircraft unit 12 is on and/or before the internal combustion engine 28 is started by the starter in flight. It should be noted that this could be an independent invention wherein the heat exchanger 40 and possibly the second fluid circuit 30 are omitted.

Turning to FIG. 5, the thermal management system 10 may be installed in aircraft 100. The aircraft 100 may be a hybrid electric (propulsion) aircraft.

The aircraft 100 may for example comprise two thermal management systems 10, one left system and one right system. In each system 10, the at least one aircraft unit configured to be used in electric propulsion of the aircraft 100 may be an electric propulsion unit comprising electric motor 14 and at least one motor control unit 16. In each system 10, the electric motor 14 may be coupled to a propeller 102. In each system 10, electric motor 14 and at least one motor control unit 16 and the at least some of the first fluid circuit 18 may be accommodated in an electric propulsion unit nacelle 104. The electric propulsion unit nacelles 104 may for example be mounted to (main) wings 106 of the aircraft 100. Each electric motor 12 may be powered by one or more propulsion battery units 108 of the aircraft 100.

In each system 10, the internal combustion engine 28 may be—or at least be part of—a turboprop engine. Each turboprop engine may be coupled to a propeller 110. In each system 10, the turboprop may at least partly be accommodated in a turboprop nacelle 112. The turboprop nacelles 112 may for example be mounted to the (main) wings 106 of the aircraft 100, preferably outboard of the electric propulsion unit nacelles 104. In each system 10, the turboprop nacelle 112 may further accommodate the second fluid circuit 30 and the heat exchanger 40. In each system 10, the first fluid circuit 18 may (hence) extend from the electric propulsion unit nacelle 104 to the turboprop nacelle 112. The turboprop engines may be powered by aviation fuel.

The aircraft 100 may further comprise a fuselage 114, an empennage 116, a cockpit 118, a passenger cabin 120, flight control surfaces (such as ailerons, elevators, a rudder, flaps, air brakes, etc.), and a landing gear. The aircraft 100 may for example be an airplane of fixed wing type with hybrid electric propulsion and designed for conventional take-off and landing.

It should be appreciated that a flowchart comprises some operations which are illustrated with a solid border and some operations which are illustrated with a dashed border. The operations which are comprised in a solid border are operations which are comprised in the broadest example embodiment. The operations which are comprised in a dashed border are example embodiments which may be comprised in, or a part of, or are further operations which may be taken in addition to the operations of the broadest example embodiments. It should be appreciated that these operations need not be performed in order. Furthermore, it should be appreciated that not all of the operations need to be performed. The example operations may be performed in any order and in any combination.

Aspects of the disclosure are described with reference to the drawings, e.g., block diagrams and/or flowcharts. It is understood that several entities in the drawings, e.g., blocks of the block diagrams, and also combinations of entities in the drawings, can be implemented by computer program instructions, which instructions can be stored in a computer-readable memory, and also loaded onto a computer or other programmable data processing apparatus. Such computer program instructions can be provided to a processor of a general purpose computer, a special purpose computer and/or other programmable data processing apparatus to produce a machine, such that the instructions, which execute via the processor of the computer and/or other programmable data processing apparatus, create means for implementing the functions/acts specified in the block diagrams and/or flowchart block or blocks.

In some implementations and according to some aspects of the disclosure, the functions or steps noted in the blocks can occur out of the order noted in the operational illustrations. For example, two blocks shown in succession can in fact be executed substantially concurrently or the blocks can sometimes be executed in the reverse order, depending upon the functionality/acts involved. Also, the functions or steps noted in the blocks can according to some aspects of the disclosure be executed continuously in a loop.

In the drawings and specification, there have been disclosed exemplary aspects of the disclosure. However, many variations and modifications can be made to these aspects without substantially departing from the principles of the present disclosure. Thus, the disclosure should be regarded as illustrative rather than restrictive, and not as being limited to the particular aspects discussed above. Accordingly, although specific terms are employed, they are used in a generic and descriptive sense only and not for purposes of limitation.

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products. It should be appreciated that the example embodiments presented herein may be practiced in any combination with each other.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

The various example embodiments described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

In the drawings and specification, there have been disclosed exemplary embodiments. However, many variations and modifications can be made to these embodiments. Accordingly, although specific terms are employed, they are used in a generic and descriptive sense only and not for purposes of limitation, the scope of the embodiments being defined by the following claims.

The invention claimed is:

1. A thermal management system for a hybrid electric aircraft, wherein the system comprises:
an electric propulsion unit comprising an electric motor and at least one motor control unit configured to be used in electric propulsion of the aircraft;
a first fluid circuit;
a turboprop engine configured for propulsion of the aircraft;
a second fluid circuit for the turboprop engine;
a heat exchanger; and
a control unit configured to:
detect a first operational state of the aircraft, the first operational state comprising: the electric propulsion unit being on, the turboprop engine being off, and the aircraft flying;
responsive to detecting the first operational state, control a set of pumps to flow fluid through the first fluid circuit for provision of heat to the second fluid circuit via the heat exchanger, wherein the first fluid circuit is arranged to:
cool the electric propulsion unit; and
provide heating to the second fluid circuit via said heat exchanger;
detect a second operational state of the aircraft, the second operational state comprising: the electric propulsion unit being off, the turboprop engine being on, and the aircraft flying;
responsive to detecting the second operational state, control the set of pumps to flow fluid through the second fluid circuit for provision of heat to the first circuit via the heat exchanger, wherein the second fluid circuit is arranged to provide heating to the first fluid circuit via said heat exchanger.

2. The thermal management system according to claim 1, wherein the second fluid circuit comprises at least one channel provided in the turboprop engine.

3. The thermal management system according to claim 1, wherein the second fluid circuit is an oil circuit.

4. The thermal management system according to claim 1, wherein the first fluid circuit is arranged to provide heating to a reservoir of the second fluid circuit via said heat exchanger.

5. The thermal management system according to claim 1, wherein the first fluid circuit or the second fluid circuit is arranged to provide heating to an engine starter battery associated with the turboprop engine.

6. The thermal management system according to claim 1, wherein the heat exchanger is connected to the first fluid circuit downstream of the electric propulsion unit.

7. The thermal management system according to claim 1, wherein the heat exchanger is a liquid-to-liquid heat exchanger.

8. The thermal management system according to claim 1, wherein the first fluid circuit is arranged to provide heating to the second fluid circuit via said heat exchanger a predetermined time before the turboprop engine is started.

9. The thermal management system according to claim 1, wherein the first fluid circuit comprises a bypass or flow selector valve, and wherein the control unit is configured to:
detect a third operational state of the aircraft, the third operational state comprising: the electric propulsion unit being on, the turboprop engine being on, and the aircraft flying; and responsive to detecting the third operational state, control the bypass or flow selector valve to divert first fluid in the first fluid circuit past the heat exchanger.

10. A hybrid electric aircraft comprising at least one thermal management system according to claim 1.

11. A thermal management method, comprising:

cooling, by a first fluid in a first fluid circuit, an electric propulsion unit comprising an electric motor and at least one motor control unit used in electric propulsion of a hybrid electric aircraft;

detecting that the electric propulsion unit is on, that the turboprop engine is off, and that the aircraft is flying;

responsive to detecting that the electric propulsion unit is on, that the turboprop engine is off, and that the aircraft is flying: providing heating from the first fluid in the first fluid circuit to a second fluid in a second fluid circuit for a turboprop engine via a heat exchanger connected to the first fluid circuit downstream of the electric propulsion unit;

detecting that the electric propulsion unit is off, that the turboprop engine is on, and that the aircraft is flying; and responsive to detecting that the electric propulsion unit is off, that the turboprop engine is on, and that the aircraft is flying: providing heating from the second fluid circuit to the first fluid circuit via said heat exchanger.

12. The method according to claim 11, further comprising:

circulating the second fluid in the second fluid circuit.

13. A computer program product comprising computer program code to perform, when executed on a computer of a thermal management system according to claim 1, the steps of:

responsive to detecting the first operational state, controlling at least one first pump to circulate a first fluid in the first fluid circuit for cooling the electric propulsion unit, and controlling a bypass or flow selector valve of the first fluid circuit to provide heating from the first fluid to a second fluid in the second fluid circuit via the heat exchanger; and responsive to detecting the second operational state, controlling at least one other pump to circulate the second fluid in the second fluid circuit, and controlling a bypass of the first fluid circuit, or flow selector valves of the first and second fluid circuits, to provide heating from the second fluid to the first fluid in the first fluid circuit via the heat exchanger.

14. The thermal management system of claim 1, wherein the first fluid circuit is coupled to the electric motor and is arranged to cool the electric motor.

15. The thermal management method of claim 11, wherein while providing heating from the first fluid in the first fluid circuit to the second fluid in the second fluid circuit for the turboprop engine via the heat exchanger, a temperature of the first fluid is higher than a temperature of the second fluid.

* * * * *